Patented Aug. 8, 1939

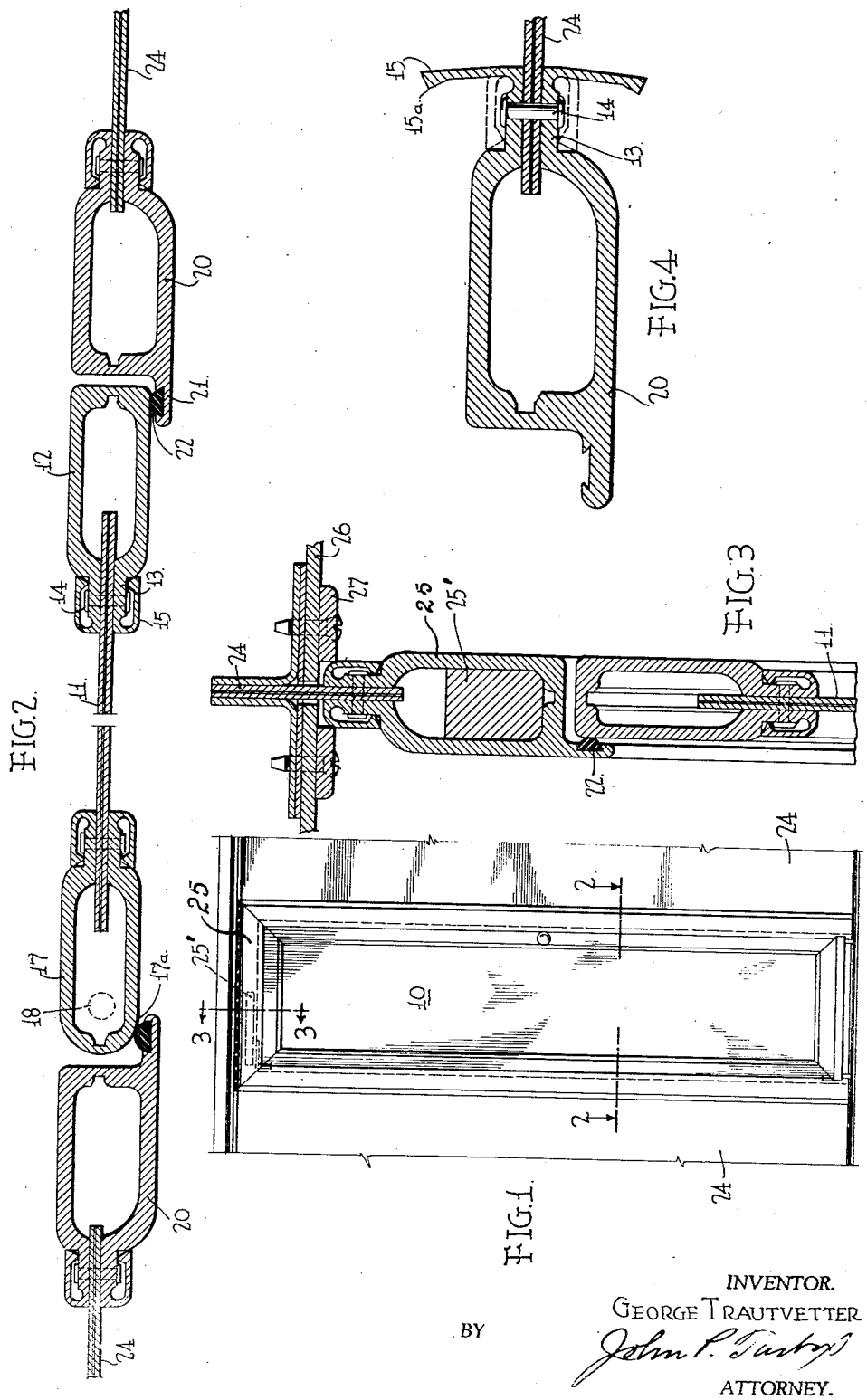

2,169,172

UNITED STATES PATENT OFFICE 2,169,172

MOLDING

George Trautvetter, Philadelphia, Pa., assignor to Edward G. Budd Manufacturing Company, Philadelphia, Pa., a corporation of Pennsylvania Application April 7, 1937, Serial No. 135,394

11 Claims. (Cl. 189—46)

This invention relates to extruded metal frames or moldings and more particularly to frames for receiving intermediate panels such as partitions, doors, etc.

One of the particular features of the present invention is to provide an improved extruded metal molding or frame having spaced shoulder attaching portions between which a panel member is received and secured, such frame having extended wings which are readily deformable to cover the desired attaching devices.

A further object of the invention is to provide an improved form of door construction which is of light weight and economical manufacture, of attractive appearance and of considerable rigidity, said door consisting of an extruded metal frame including stiles and rails which are of hollow cross section and have spaced walls between which a laminated panel is secured.

Another object of the invention is to provide a frame member for a door jamb having an integral jamb extension and an open hollow body portion into which a panel may be extended and secured, such frame member being readily made in substantial lengths by extruding suitable metals.

Further objects and advantages of the present invention will appear from the following description of preferred forms of embodiment thereof taken in connection with the attached drawing, in which, Fig. 1 is a partial elevation of a door and adjoining partition structure.

Fig. 2 is a horizontal cross section taken substantially along the line 2—2 of Fig. 1.

Fig. 3 is a vertical cross section taken substantially along the line 3—3 of Fig. 1.

Fig. 4 is an enlarged cross section through a door jamb showing the integral wings in their extended position prior to covering the attaching means, and in dotted lines, the ultimate position.

The improved molding or frame member in accordance with one form of embodiment of my invention is shown in connection with the door 10 which is of a light weight type being particularly useful for internal doors of a rail car or other vehicle. The central panel generally indicated at 11 in Fig. 2 is conveniently a laminated metal type and consists of a plurality of sheets of aluminum or other light weight metal, such laminations being relatively stiff and with an intermediate sound-deadening and vibration damping material.

The door frame is an extruded metal member generally represented by the character 12 in Fig. 2, such member being of generally hollow cross section with one edge open and having reinforced shoulders 13 at that edge and between which the panel 11 is received. The spaced shoulders are initially convex, and with the panel in place, may be drilled to receive securing means 14 such as rivets or other well known forms of securement. When the rivets are drawn tight, the convex shape is flattened out somewhat, but the contact between the shoulders and the panels is primarily at the outer edge so that there is no apparent parting line. This condition remains throughout the completion of the assembly procedure.

The extruded frame is also provided with integral projecting wings 15 which as shown in Fig. 4, normally extend from the shoulder portions 13 so that the securing devices 14 may be projected through the frame 12 and the panel 11. The wings 15 have suitable spacing means such as the projections 15a so that when the securing devices 14 have been anchored in place and the wings 15 have been bent over the securing devices, the projection 15a will contact with the flat surface of the shoulder 13 and the outer edge will form a substantially smooth surface with the main body of the frame 12.

The frame 12 may be made of any suitable metal including appropriate aluminum alloys, brass, etc., which are relatively stiff but which can be suitably worked so that the wings 15 may be forced down over the securing means. Such a structure is of good appearance unpainted or will readily receive paint if desired. The necessary cross section of metal can be obtained by appropriately forming the extrusion dies and it is found that a door of this type is stiff and strong and will withstand considerable wear. The same cross section can be used for both rails and the stiles unless a hidden pivot door is used such as shown and in such case, the pivot stile is rounded as shown as 17a in Fig. 2 and such construction is then free to rotate on the pivot pins 18.

Similar extruded metal sections may also be used for the partition panels including the door framework. The door jamb section is shown at 20 and in addition to the wings, characteristic of the door frame section, it is provided with an integral projecting portion 21 adapted to receive the flexible door stop 22. Both vertical door jamb sections may be alike and in addition, a lintel section 25 can also be formed of the same extruded section. It is sometimes necessary to provide an internal member 25' of a suitable material to closely fit within the hollow section for the attachment of accessories, such as door stops, etc. In each case, the partition structure 24, which is also of a laminated material similar to the door panel 11, or of any other desired material, is projected into the hollow frame structure and joined thereto by the attaching means, after which the wings are forced into place. At the ceiling 26 as shown in Fig. 3, the lintel 25 is first attached, after which the moldings 27 are added, to give adequate room for movement of the cover wings 15. With the door and jamb frames of substantially the same cross section, they can be readily made on the same form of extrusion dies, modified in the one case, only to eliminate the projecting jamb faces 21. Great simplicity and economy is thus possible.

Although I have shown preferred forms of embodiments of my invention, I am aware that other modifications may be made and I therefore desire a broad interpretation of my invention within the scope and spirit of the disclosure herein and of the claims appended hereinafter.

What I claim is:

1. A hollow one-piece frame member of malleable or pliant metal having spaced shoulder portions between which a panel may be inserted and through which the panel may be attached, a plurality of wings extending from said shoulder portions, said wings being movable against the body of the frame member to cover the shoulder portions and form an outer finish molding in surface continuation of the body of the frame member.

2. A wall structure comprising a panel, a framework for said panel, said framework being hollow and being open on one edge, shoulders at said edge receiving the panel between them, means uniting said shoulders and said panel and integral means on said framework movable thereagainst to cover said uniting means and form an outer finish molding in surface continuation of the body of the framework.

3. A partition comprising a panel structure and a framework for said panel structure, said framework consisting of a hollow extruded malleable metal molding having spaced shoulder portions between which said panel extends and through which it is secured and means on said framework adapted to be moved against the same into covering position over the shoulder portions and form an outer finish molding in surface continuation of the body of the framework.

4. A wall structure comprising a panel, a framework for said panel, said framework being hollow and being open on one edge, reinforced shoulders at said edge receiving the panel between them, means projecting through said edge for attachment to said panel, integral means on said framework movable thereagainst to cover said attaching means and form an outer finish molding in surface continuation of the body of the framework and integral projecting means projecting from the edge opposite the open edge of said framework constituting a door jamb face.

5. A wall structure comprising a plurality of panels and a door carried by said panels, a framework surrounding the edges of said panels and said door, said framework being substantially hollow in cross section and having an open edge having portions between which the panel projects, means to attach said portions and panel together, and means integral with the framework and movable thereagainst to cover said attaching means and form an outer finish molding in surface continuation of the body of the framework.

6. A door and door jamb structure for a wall panel having an opening therein, comprising a plurality of door jambs and a plurality of door stiles and rails cooperating therewith, said door jambs, stiles and rails comprising substantially similar hollow cross section members having an open edge portion forming reinforced shoulders between which a panel structure is received, securing means for securing said reinforced shoulders to said panel structure, and integral means on said members deformable against the bodies of said members into covering position over said securing means and forming an outer finish molding in surface continuation of the bodies of said members.

7. A door and door jamb structure for a wall panel having an opening therein, comprising a plurality of door jambs and a plurality of door stiles and rails cooperating therewith, said door jambs, stiles and rails comprising substantially similar hollow cross section members having an open edge portion forming reinforced shoulders between which a panel structure is received, securing means for securing said reinforced shoulders to said panel structure and integral means on said members deformable against the bodies of said members into covering position over said securing means to form an outer finish molding in surface continuation of the bodies of said members, said door jambs having integral projecting portions against which the door is adapted to contact.

8. A door comprising a hollow framework having spaced portions at one side thereof, and a central panel extending into said framework between said spaced portions, means to secure said spaced portions of the framework to said panel and integral means on said framework movable against the body of the framework into covering position over said securing means to form an outer finish molding in surface continuation of the body of the framework.

9. A door as claimed in claim 8 in which the means movable into covering position includes a plurality of integral wings having edge portions contacting with the body of the framework to give a substantially flush appearance.

10. An extruded metal frame member of hollow cross section having spaced panel attaching portions to receive a panel therebetween and means deformable against the body of the frame member to cover the attaching portions and form an outer finish molding in surface continuation of the body of the frame member.

11. A frame member as claimed in claim 10 in which the frame member is a door jamb and is formed with an overlap flange integral with said frame member.

GEORGE TRAUTVETTER.